US006320941B1

(12) United States Patent
Tyroler

(10) Patent No.: US 6,320,941 B1
(45) Date of Patent: Nov. 20, 2001

(54) STAND ALONE ELECTRONIC MAIL NOTIFYING DEVICE

(76) Inventor: Dan Tyroler, 37 Baker Hil Rd., Great Neck, NY (US) 11023

( * ) Notice: Subject to any disclaimer, the term of this patent is extended or adjusted under 35 U.S.C. 154(b) by 0 days.

(21) Appl. No.: 09/004,428

(22) Filed: Jan. 8, 1998

(51) Int. Cl.[7] .................................................. H04M 11/00
(52) U.S. Cl. ........................................ 379/93.24; 709/206
(58) Field of Search ........................ 379/88.02, 93.01, 379/93.23, 93.24, 88.11; 709/206, 207

(56) References Cited

U.S. PATENT DOCUMENTS

| | | | |
|---|---|---|---|
| 5,164,982 | * 11/1992 | Davis | 379/93.17 |
| 5,327,493 | * 7/1994 | Richmond et al. | 379/372 |
| 5,333,266 | * 7/1994 | Boaz et al. | 709/206 |
| 5,377,354 | * 12/1994 | Scannell et al. | 709/103 |
| 5,493,692 | * 2/1996 | Tyra et al. | 395/703 |
| 5,500,893 | 3/1996 | Onosaka . | |
| 5,561,703 | * 10/1996 | Arledge et al. | 455/31.2 |
| 5,590,178 | 12/1996 | Murakami . | |
| 5,647,002 | 7/1997 | Brunson . | |
| 5,742,905 | * 4/1998 | Pepe et al. | 455/461 |
| 5,754,778 | * 5/1998 | Shoujima | 709/206 |
| 5,757,891 | * 5/1998 | Wang | 379/93.24 |
| 5,850,519 | * 12/1998 | Vazana | 709/206 |
| 5,898,780 | * 4/1999 | Liu et al. | 380/25 |
| 5,944,786 | * 8/1999 | Quinn | 709/206 |
| 5,956,521 | * 9/1999 | Wang | 710/35 |
| 5,964,833 | * 10/1999 | Kikinis | 709/206 |
| 6,029,164 | * 2/2000 | Birrell et al. | 707/3 |
| 6,052,442 | * 4/2000 | Cooper et al. | 379/88.19 |

* cited by examiner

Primary Examiner—Fan Tsang
Assistant Examiner—Roland G. Foster
(74) Attorney, Agent, or Firm—Gottlieb, Rackman & Reisman, P.A.

(57) ABSTRACT

A device dedicated to providing information to a customer regarding e-mail messages. The device, in its simplest configuration has an annunciator showing the receipt of one or more e-mail messages held for the customer by a remote ISP. In more advanced configurations, the e-mail is prioritized and the device shows the messages having certain priority. In even more advanced configuration, the device may also display and or announce e-mail sender's name and may also display the subject of the e-mail message if this item was provided by the e-mail sender, and may also display the actual e-mail message text. The device may be disposed in small housing dedicated for e-mail display and announcement or alternatively may be incorporated into another device such as a telephone or any other electronic consumer equipment.

20 Claims, 7 Drawing Sheets

STAND ALONE ELECTRONIC MAIL NOTIFYING DEVICE

BACKGROUND OF THE INVENTION

A. Field of Invention

This invention pertains to a device for notifying or indicating to a user the receipt of electronic mail messages and more particularly to a device which is a stand-alone device, or at least separate from a standard data processing device such as a computer, although it may be part of, or incorporated into other types of electronic devices used in the home or office, such as an answering machine, a telephone, a security system, or other electronic consumer devices.

B. Description of the Prior Art

Electronic mail, or e-mail as it is colloquially called refers to messages that are exchanged by users using computers, mainly over the Internet. Typically in such a system both the sender and a receiver have an account with a company which provides access to the Internet, normally referred to us as Internet Service Provider, or ISP. The two parties may have the same ISP, or may have different ISPs. In either case, each party is assigned a unique address on the Internet for sending or receiving an e-mail communication. The transmitter transmits the message by e-mail using his computer or other similar data processing equipment. The ISP of the receiver stores this message in a particular dedicated memory device configured for this purpose, which location is usually referred to as mail box since normally only the designated receiver may gain access to it. When the receiver signs on with his ISP, (by establishing communication between his computer and his ISP), he can either check his mail box, or depending on the particular ISP, may actually be notified on his computer monitor, that he has a message. The user then access his mail box and downloads from the mail box the message. Once the message is downloaded, the receiver can save the message, print it, and in general do anything that he can normally do with any other digital file. The messages may include text, still and moving pictures, audio files, and so on.

E-mail has become so popular that many reports have indicated that it is the cause of major slow-downs of the Internet. AOL, one of the largest provider of e-mail and other Internet services has recently reported that it was handling over 18 million e-mail messages a day.

Some customers have continuous connections to the Internet so that they can check or get notified of an e-mail message automatically as their ISP has received and processed their e-mail message. However, most customers do not have a direct connection to the ISP and can sign on only through a standard communication channel such as telephone line, cable line or satellite connection. The process of turning on the computer, waiting for it to boot up, and then waiting for it to establish communication connection with the ISP is not only time consuming but also a waste of time if this was the only purpose for establishing communication with the ISP and realizing that there was not any message awaiting for the user. Beside the fact that this process is usually time consuming, it may not be successful if during certain times of the day when electronic traffic is very high. Moreover certain ISPs and connection companies charge a premium for the service and/or the communication channel during certain times of the day, such as, during regular business hours.

OBJECTIVES AND SUMMARY OF THE INVENTION

In view of the above-mentioned disadvantages of the prior art, it is an objective of the present invention to provide a device capable of automatically indicating to a customer if e-mail messages awaiting for him, so that the customer does not have to access his Internet account via his computer or other similar data processing equipment, for this purpose.

A further objective is to provide a device which can be also automatically set to check for e-mail any time of the day, without any prompting from the customer.

A further objective is to provide a device which is relatively simple to implement and can be incorporated/embedded easily into other type of customer electronic devices.

Other objectives and advantages of the invention shall become apparent from the following description. Briefly, an e-mail annunciating device constructed in accordance with this invention includes a stand-alone housing, a controller for establishing communication with a remote ISP provider, said ISP provider receiving messages designated to the customer, and a display device for showing when a message designated for the customer has been received. The controller contacts the ISP provider, either at regular intervals, or on demand, and downloads information descriptive of the messages. This information may be simply indicative of presence or absence of new message, or may include other data, such as the address of the sender, the subject matter, and even the text of the message.

In the simplest embodiment, the presence or absence of messages is indicated by an LED light on the housing. In more complex embodiments, messages of various priorities may be indicated, as well as other information such as the subject matter of the message, the sender's address or even text from the message. Optionally, audio as well or instead of visual indication may be provided regarding received messages.

DETAILED DESCRIPTION OF THE INVENTION

Figure 1:
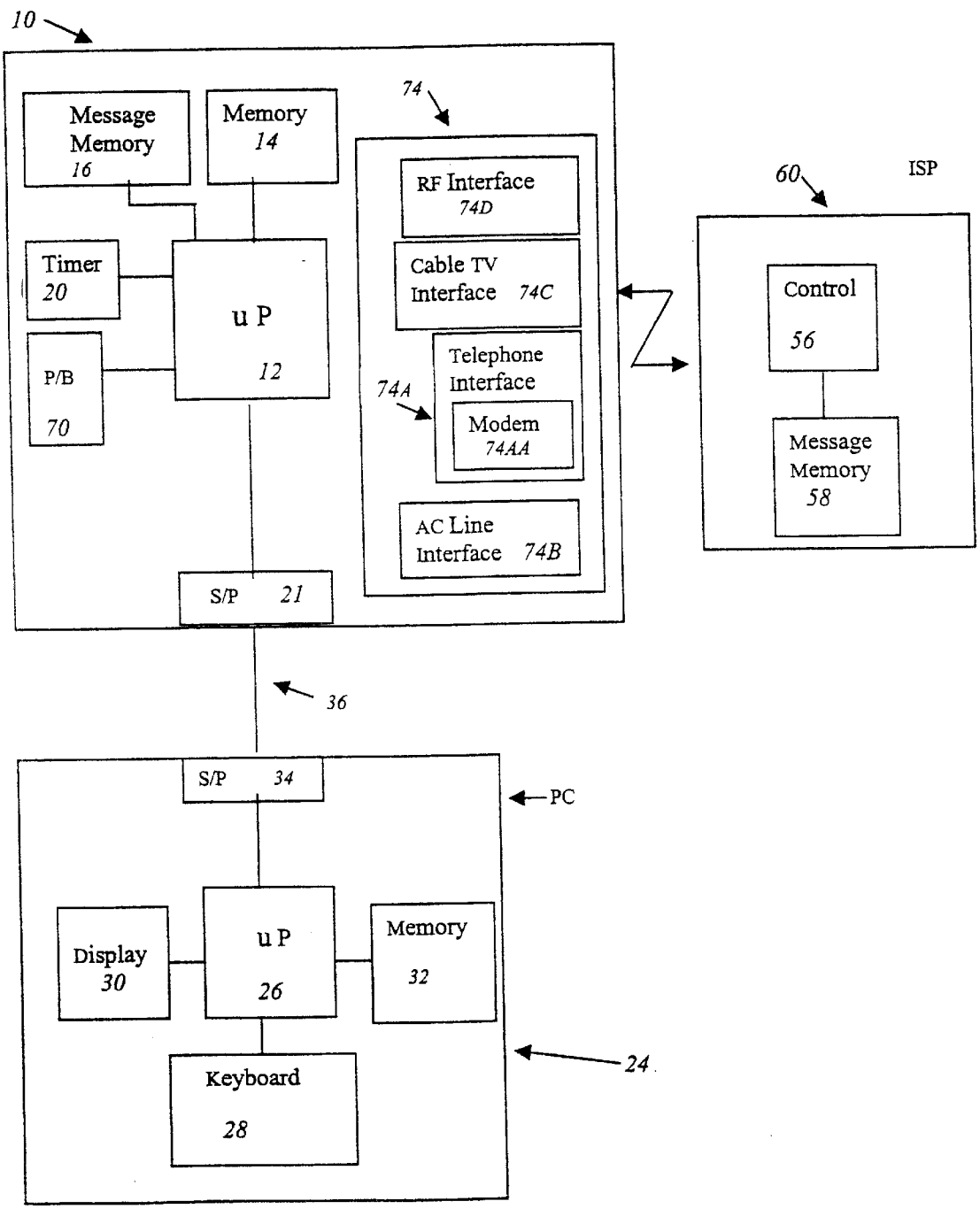
FIG. 1 shows a block diagram of an e-mail message indicating device constructed in accordance with invention, and its connections to a remote ISP via one of several suggested interfaces.

Referring first to FIG. 1, device 10 generally includes a controller 12, a data memory 14, a message memory 16, a timer 20. The data memory 14 includes the program for the controller 12 as well as the data required to sign on to a designated ISP and get the messages for a particular customer. The memory 16 is used to store information indicative of whether messages have been received or not, information descriptive of messages and the texts of the messages. The display 18 is used to indicate to the customer whether there are any messages. As shall be described below, the display may be used to provide to the customer a wide range of information depending on the features that has been selected for a particular device.

Since it is expected that the device 10 will be relatively simple to use, it may not have a direct means of entering setup information, which is required only the first time the device is used. Therefore the device 10 may be provided with an external port 21 for interfacing with an external device. For example, in FIG. 1, FIG. 10 is shown as being connected temporarily to a standard PC 24. PC 24 includes a microprocessor 26, a keyboard 28, a display 30 and a memory 32. For connection with other devices, the PC 24 also has a port 34. In FIG. 1, PC 24 is shown as being connected to device 10 through a cable 36 attached to external port 21. Ports 21, 34 may be serial ports or parallel ports. Alternatively, the ports 21, 34 may be IR transceivers in which case coupling between devices 10, 24 takes place by interchanging IR signals.

Once the two devices 10, 24 are in communication, data is downloaded from memory 32 to memory 14 relating of the following information:

a. Identity and telephone number of the ISP used by the customer;

b. The identification of the customer required to obtain access to his e-mail box;

c. Other information specific to the operation of the device as customized for the consumer.

This information is stored in memory 14 and the devices 10, 24 can now be disconnected and the device 10 can go into operation, as a stand alone device. More specifically, under the operation of the timer 20, the controller at regular intervals programmed by the customer establishes communication through an interface 74, with a controller and a message memory of an ISP 60. Timer 20 is preferably implemented by software in the controller 12 however it is shown in FIG. 1 as a discrete component for the sake of clarity. In effect the controller signs on the ISP using the customer account and ID and requests information regarding e-mail messages. Controller 56 then checks for messages in memory 58 for the customer and provides the appropriate information to the controller 12. The controller 12 then signs off, stores the appropriate information about the messages (if any, as discussed below) and activates the display 18 to provide the appropriate indication to the customer. Alternatively, or in addition, the customer may request at his convenience that device 10 checks whether there is e-mail by activating a pushbutton 70 provided for this purpose.

At the present time, the most common means used to establish communication with an ISP is via telephone lines. Thus in FIG. 2 an analog communication circuit 74 and other telephone related circuitry 76 is provided for this purpose. Circuit 74 includes a telephone interface 74A and a modem 74AA is provided. These components are readily available as off-shelf Several other channels are known which may be used to establish communication with an ISP as well. For example, interface 74 may include an AC line interface 74B whereby interfacing is obtained from signals superimposed on the AC service lines. Another alternative is a cable interface 74C which allows communication with an ISP via TV cable wire. Yet another interface may be an RF interface 74D whereby communication is established over an RF link from a remote land-based or satellite based transceiver. There are several such schemes are proposed for this purpose, including schemes which consist of combinations of these schemes, wherein one channel may transmit information from the customer to the ISP and a different channel may be used to receive information from the ISP.

Figure 2:
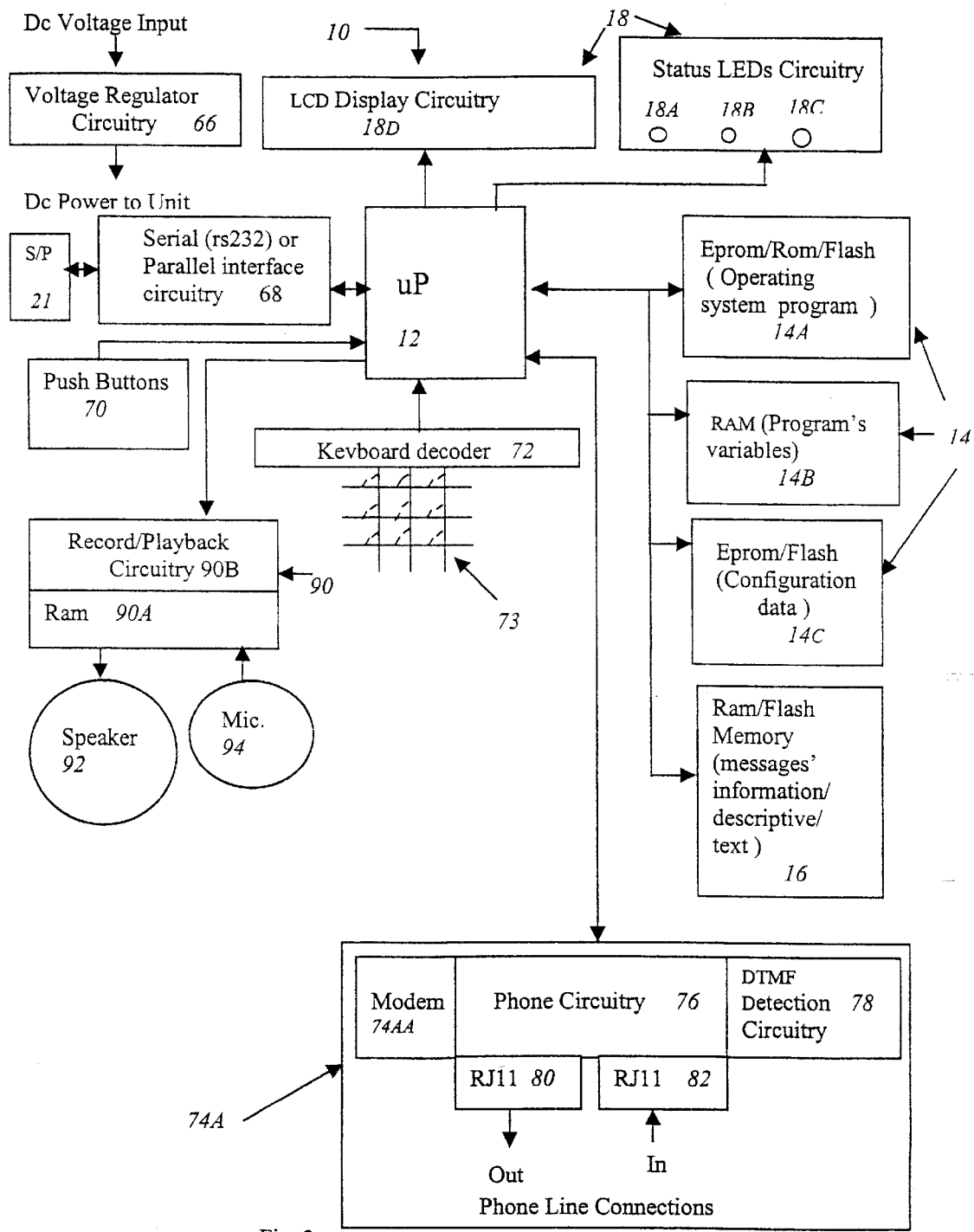
FIG. 2 shows a more detailed block diagram of the device of FIG. 1.

Referring to FIG. 2, typically, device 10 includes the microprocessor 12 which provides the various control signals required. Memory 14 includes an EPROM, flash memory or ROM 14A, a RAM 14B and an EEPROM 14C. ROM 14A is used to store the operating system program of the microprocessor 12. RAM 14B is used as a temporary, or "scratch pad" memory by microprocessor 12. EEPROM 14C, which may also be a flash memory is non-volatile read write memory and is used to store the various variables necessary for the operation of the microprocessor 12, such as the telephone number of the ISP, its dialing protocol, the name and password of the customer, his e-mail address etc. The device 10 may further be provided with a dedicated memory containing a list of addresses of e-mail senders. This list is programmable by the user. Alternatively, this table is stored in memory 14C as well. The information for memory 14C is received from an external source, such as PC 24, as discussed above, through an RS232 interface circuit 68. Alternatively, a keyboard 73 may be provided with a keyboard decoder 72 for entering the customer specific information.

Power for device 10 is received from an external standard power converter and fed to one or several voltage regulators 66 and then used by all the components of the device 10.

Display 18 includes one or more status LEDs 18A, 18B, 18C, and optionally an LCD display 18D.

For purposes of illustrating the preferred embodiment, the interface circuit is shown for using a standard analog line as the communication channel. Therefore in FIG. 2, the communication interface circuitry 74A is shown, which is connected to an input and output connectors 82 and 80. Connectors 80, 82 may be, for instance, standard RJ11 connectors. Input connector 82 is coupled to the incoming phone lines. Output connector 80 could be coupled to a local phone, if the customer desire so. Optionally a standard DTMF detection circuit 78 may also be provided in interface 74A for sensing signals from the telephone (Not shown) connected to output connector 80. Thus, this external telephone may be another way of entering information into device 10.

The device 10 may also include a record/playback circuit which could be either a solid state RAM or an analog memory IC chip 90, which is capable to do both, record and playback. The IC 90 may be, for example, an IC of the ISDxxxx series from ISD Inc.

The device 10 may also be provided with a speaker 92 and a microphone 94.

Preferably all the circuits shown in FIG. 2 are mounted on a common circuit board.

As previously mentioned, the device 10 can have a number of different configurations, FIG. 2 showing the elements of the most complex embodiment, it being understood that for the simpler embodiments, the unnecessary elements of FIG. 2 are omitted.

Figure 3:
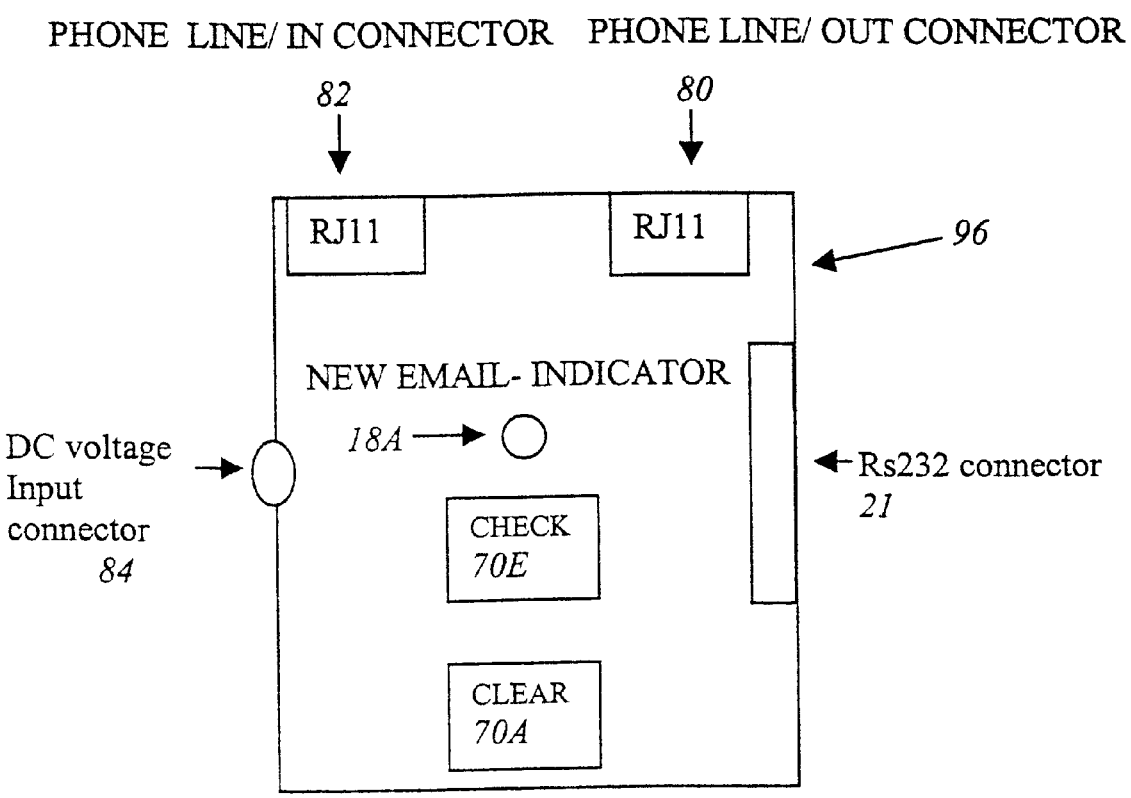
FIG. 3 shows a somewhat stylistic view of a front face of the device of FIGS. 1 and 2.

Starting with the simplest, the device 10 may be a simple annunciator. In this configuration, as shown in FIG. 3, the device 10 is disposed in a housing 96 with as single LED 18A, connectors 80, 82, 21 (for the serial port) and 84 ( the DC power connector) and two single pushbutton keys 70A and 70E. In this configuration, the customer specific information is loaded through the serial port 21. A standard telephone can be connected to output 80. At predetermined times, or upon pressing the pushbutton CHECK key (70E), the microprocessor contacts the ISP 60 to determine if there the customer has any new e-mail. If the ISP indicates that the customer did receive e-mail, the microprocessor activates LED 18A. The LED 18A stays on until the customer acknowledges the same by pushing the clear key 70A. The LED 18A is then turned off. The customer then access the ISP at his convenience through his standard access device, (such as a personnel computer) and reads his e-mail.

Figure 4:
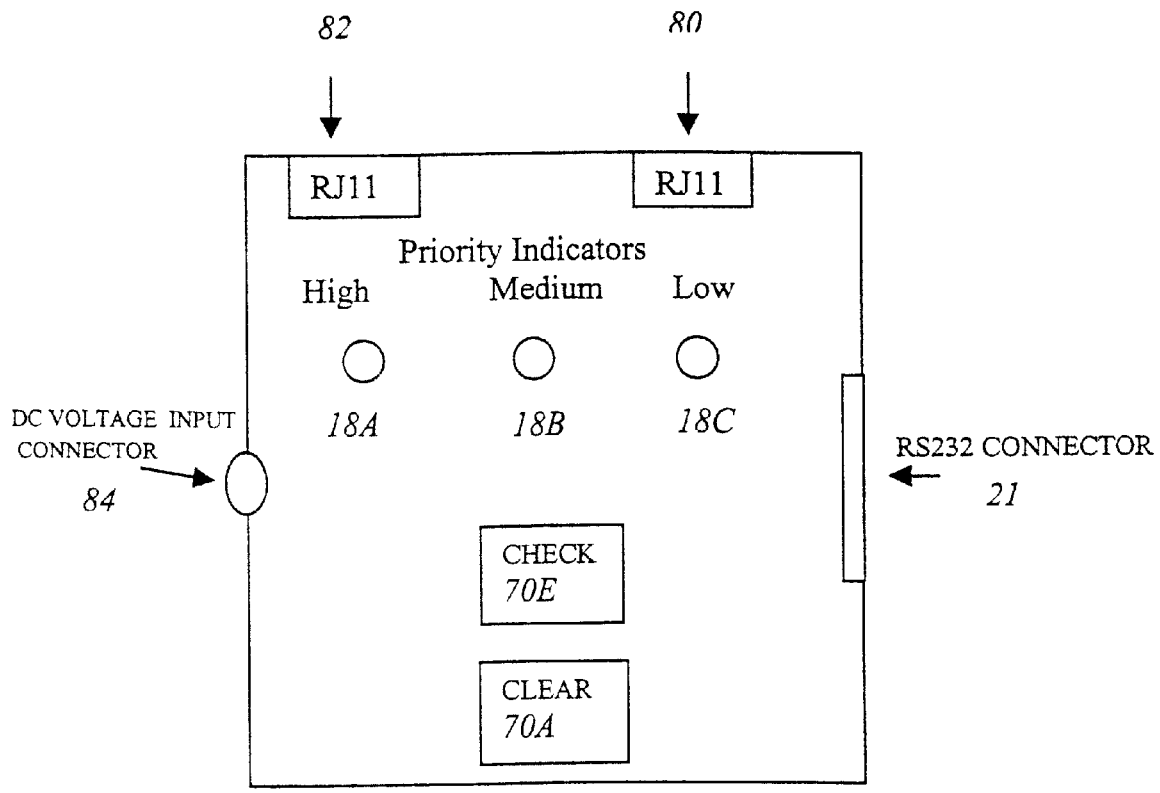
FIG. 4 shows a stylistic view of an alternate embodiment of the invention.

A slightly more complex configuration is shown in FIG. 4. For this configuration, it is assumed either that a particular message has been encoded with a priority identification, or that the microprocessor has other means of determining the priority of messages. For instance, a message may be identified as having a high, medium or low priority. Alternatively, the customer may provide a high priority list stored in memory 14C containing certain addresses of possible senders who are very important to the customer, a second list of senders of somewhat lower priority and a third list of senders with very lower priority. Any messages from an address not on the list may be considered of low priority. The microprocessor 12 checks the address from which each message is received and when appropriate, activates either the LED 18A for high priority, 18B for medium priority, or 18C for low priority. If a large number of messages are received, two or three LEDs may be activated, or alternatively the microprocessor may be programmed to activate only the LED for the highest priority message received.

Figure 5:
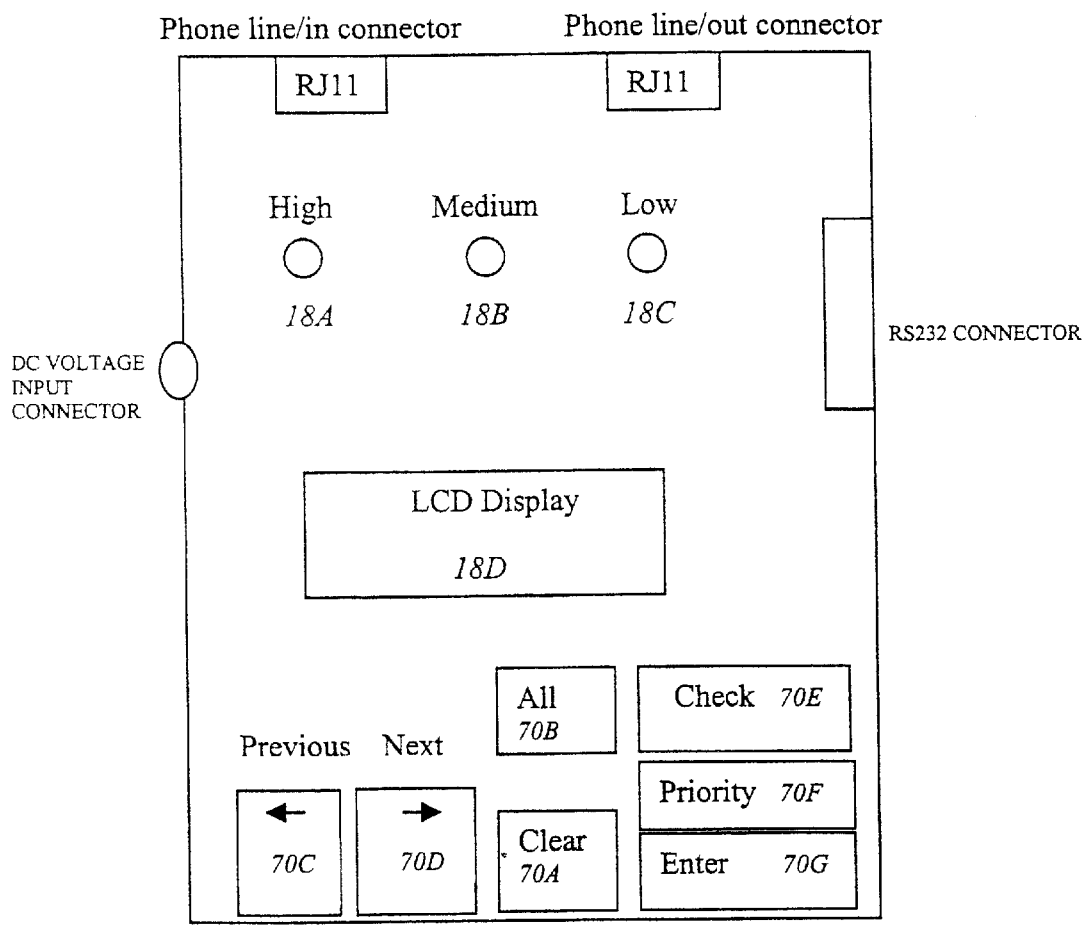
FIG. 5 shows a stylistic view of another alternate embodiment of the invention.

For the embodiments described so far, the messages themselves need not be downloaded. Their address, or for the simplest configuration, the presence or absence of e-mail is sufficient. The embodiment of FIG. 5 contemplates, that the device 10 downloads not only the address of the senders but selectively either information descriptive of the messages (such as for, example the title or reference portion of each message) or alternatively the whole text of the message. The information may alternatively or in addition may also be the sender's name and e-mail address, becoming in effect a quick reference e-mail handling apparatus. For this purpose, in addition to the features described above, the device 10 further includes a multi character alpha numeric characters LCD display 18D and selection buttons 70A–70G. The information descriptive of messages as described above is downloaded from an ISP and stored in RAM 16. The information is then selectively displayed on display 18D. The customer then can select to review either all the downloaded messages (either the whole text, or the information descriptive of each message) by activating key 70B. He can review the next or the preceding message using keys 70C, 70D, clear the messages (key 70A) or enter the address of the sender (if new, and was not entered during setup) to any of his lists (key 70G) and also select its priority by activating keys 70F, 70C, 70D and turning on the appropriate required priority display 18A, 18B, 18C and ending the selection by pressing the 'enter' key 70G. Thus the customer is given with this device the capability of efficiently and quickly inspect his e-mail without the necessity of going on line via his PC.

Figure 6:
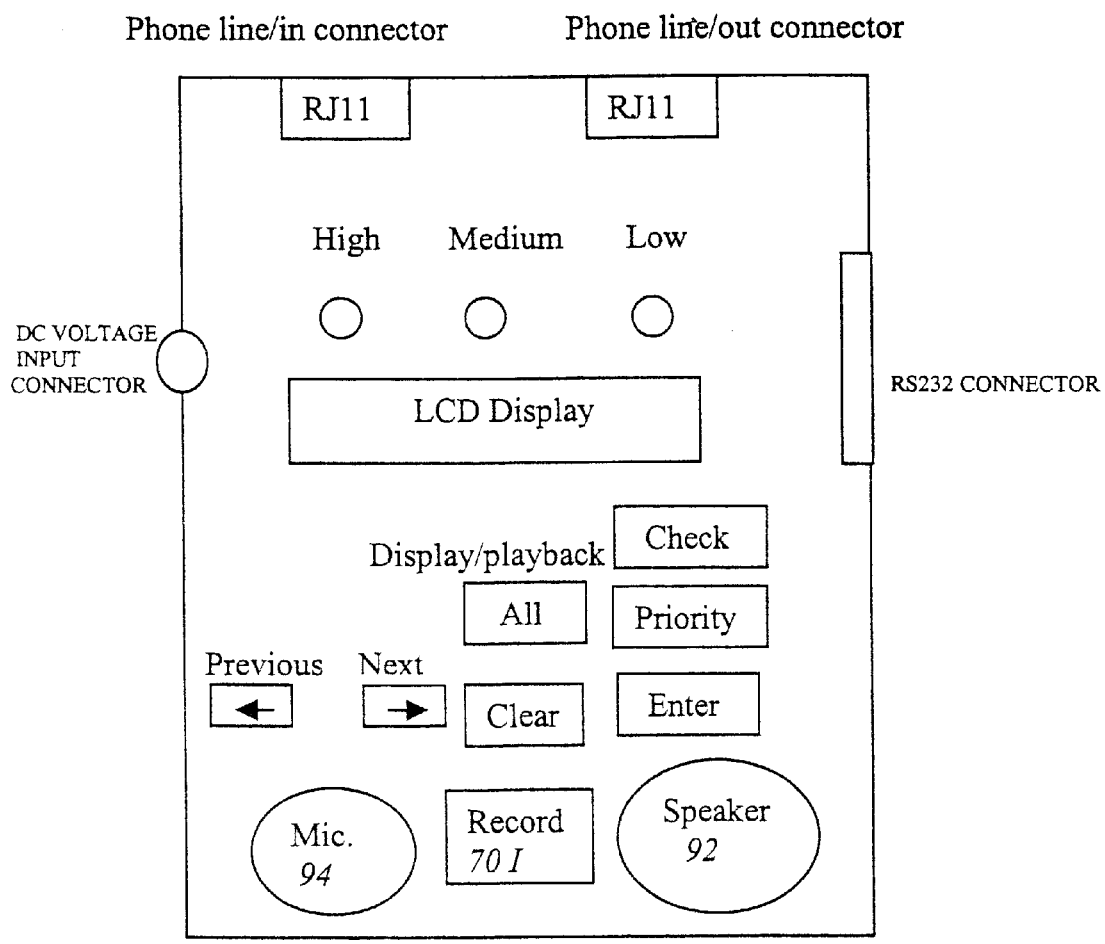
FIG. 6 shows another alternate embodiment of the invention.

A more advance configuration of the device is referred in FIG. 6. In this configuration, in addition to the previously mentioned features, the device will allow the user to play back an announcement related to the received e-mail message. Announcements could be either status indication or announcing the e-mail sender names, all via speaker 92. Addresses and names have to be pre-recorded via microphone 94. The audio message storage could be either a random access memory 90A, a separate solid state audio record/playback integrated circuit 90B or other alternative technologies including analog ram devices, such as Information Storage Devices ISDXXXX family which handle both record and playback.

The audio features mentioned above provide additional means to the visual indication means of announcing information about received e-mail messages.

In all above mentioned configuration a dtmf circuitry (78 in FIG. 2) could be used to receive commands from a standard telephone, not shown, using the handset keypad of the remote telephone to execute different functions according to the complexity of the device in use.

Figure 7:
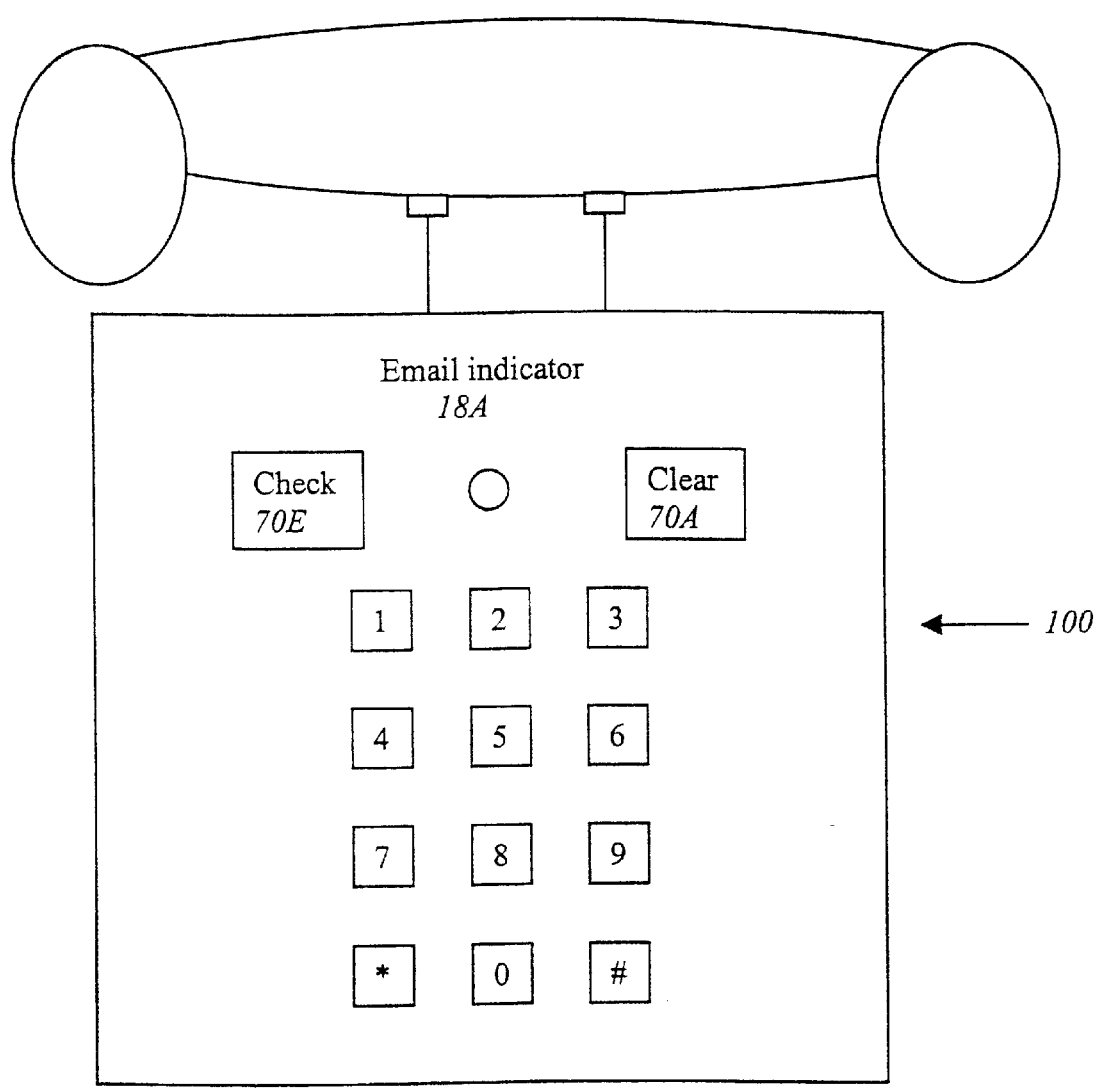
FIG. 7 shows an e-mail message indicating device constructed in accordance with this invention, incorporated into a standard household device such as a telephone.

Device 10 can be implemented as stand-alone device, or can be incorporated into other electronic apparatus, especially in apparatus which are connected to telephone lines, such as telephones, answering machines, and so on. For instance, FIG. 7 shows how an e-mail annunciating device similar to the one in FIG. 3 could be incorporated into a standard desk telephone 100.

It should be understood that the subject device is useful in a number of different environment. For example it may be used to detect messages received on the Internet and getting some preliminary information about theses messages, without the need to go on line via the computer. Alternatively, the device may be used to detect e-mail messages interchanged by other means such as an Intranet system and the like.

Obviously numerous modifications may be made to this invention without departing from its scope as defined in the appended claims.

I claim:

1. A dedicated device for indicating e-mail messages sent to a specific user, comprising:

a housing;

a memory holding a list of senders who can send e-mail messages to the user, each sender being designated by the user, each sender being designated within said memory with a priority level;

a controller for establishing communication with an ISP provider, said provider automatically receiving e-mail messages which originate from specifically identified senders, said controller being adapted to initiate a request to said provider for information regarding said e-mail message and to retrieve said information; said controller being adapted to designate a message priority level to each received message in accordance the priority designated to the respective sender in the memory; and disposed on said housing and including one or more lights for annunciating when said information indicates the presence of said e-mail messages and the priority of said e-mail messages when said e-mail messages are detected.

2. The device of claim 1 wherein said annunciator is a visual display.

3. The device of claim 2 wherein said display includes a light emitting element.

4. A device dedicated to indicate to a user the presence of e-mail messages addressed to the user, comprising:

a housing;

an indicator responsive to a command and disposed on said housing and including one or more lights for indicating when a customer has received an e-mail message having a designated priority;

a dedicated controller disposed in said housing and adapted to generate a request to a remote server regarding the receipt of e-mail messages for a specific customer, said dedicated controller being adapted to detect the sender for each e-mail message and to designate said priority level for each received e-mail message by using a list of senders provided by the user;

a communication interface for communication over a standard channel with said server, said interface transmitting said request to said server and receiving a response; and a memory that stores an address and said list of senders;

wherein said controller receives said response and selectively activates said indicator by generating said command only if the address of a received message corresponds to an address in said memory.

5. The device of claim 4 wherein said response includes information indicating for a specific message one of a sender's address, a message title, and a message text.

6. The device of claim 5 wherein said indicator includes an message display for displaying said message.

7. The device of claim 4 further comprising a plurality of selector keys disposed in said housing, said controller receiving commands for managing said messages.

8. The device of claim 4 further comprising an input port for receiving customer specific information.

9. The device of claim 4 wherein said communication channel is selected from one of an analog telephone channel, a digital telephone channel, a cable channel, an RF channel, a power line channel and a satellite channel.

10. The device of claim 4 wherein said indicator comprises an audio circuitry responsive to said command for announcing when said customer has received said e-mail message.

11. The device of claim 10 further comprising audio circuitry that includes electronic audio playback circuitry and a speaker to announce information related to said e-mail message.

12. The device of claim 11 further comprising recording circuitry that includes an electronic recording circuitry and microphone to record the related information required to be announced later on which relates to the said e-mail message.

13. The device of claim 4 wherein said indicator is a visual indicator.

14. A composite device without a general purpose computer comprising;

a housing;

a telephone interface for receiving audio messages;

a memory storing a plurality of e-mail addresses designated by the user, said e-mail addresses, each e-mail address being assigned a priority level;

a dedicated controller provided to manage e-mail messages for a customer and adapted to automatically send requests to a remote server through said telephone interface and to receive information indicating that e-mail messages are present for the customer from a specific sender identified by the customer, said e-mail being designated a priority level based on the identity of the sender; and a display adapted to display messages indicative of the presence of e-mail messages based on their designated priority as indicated by one or more lights disposed on said housing when said e-mail messages are detected.

15. The device of claim 4 further including handset whereby said device is a standard telephone.

16. The composite device of claim 4 wherein said controller is programmed to provide only e-mail notification.

17. The composite device of claim 14 wherein said telephone interface is an answering machine adapted to receive voice messages over standard telephone lines.

18. The composite device of claim 17 wherein said indicator is adapted to provide information about received e-mail messages and voice messages.

19. The composite device of claim 14 wherein said indicator is a visual indicator.

20. The composite device of claim 14 wherein said indicator is audible indicator.

* * * * *